(12) United States Patent
Lennartsson et al.

(10) Patent No.: US 11,124,111 B2
(45) Date of Patent: Sep. 21, 2021

(54) DEFORMABLE CARRIER FOR AN ELONGATE LIGHT GUIDE IN A VEHICLE

(71) Applicant: Volvo Car Corporation, Gothenburg (SE)

(72) Inventors: Anders Lennartsson, Gothenburg (SE);
Stefan Langner, Gothenburg (SE);
Markus Andersson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/546,673

(22) Filed: Aug. 21, 2019

(65) Prior Publication Data

US 2021/0053486 A1 Feb. 25, 2021

(51) Int. Cl.
*B60Q 3/54* (2017.01)
*F21V 8/00* (2006.01)
*B60R 21/02* (2006.01)
*B62D 1/19* (2006.01)

(52) U.S. Cl.
CPC ............. *B60Q 3/54* (2017.02); *G02B 6/0006* (2013.01); *B60Q 2500/10* (2013.01); *B60R 21/02* (2013.01); *B62D 1/192* (2013.01)

(58) Field of Classification Search
CPC ......... G02B 6/0006; B60Q 3/54; B60Q 3/283
See application file for complete search history.

(56) References Cited

U.S. PATENT DOCUMENTS

| 6,062,595 A | * | 5/2000 | Ha | B60R 21/21658 200/61.54 |
| 6,594,417 B1 | * | 7/2003 | Hulse | G02B 6/001 362/487 |
| 8,459,713 B2 | * | 6/2013 | Sella | B60R 21/215 280/728.3 |
| 10,166,914 B2 | * | 1/2019 | Jablonski | B60Q 3/233 |
| 2008/0090031 A1 | * | 4/2008 | Hirzmann | G09F 13/22 428/31 |
| 2009/0121459 A1 | * | 5/2009 | Bostick | B60Q 3/14 280/728.3 |
| 2014/0210191 A1 | * | 7/2014 | Bosch | B60Q 3/64 280/728.3 |
| 2019/0322211 A1 | * | 10/2019 | Kim | B60Q 3/14 |

* cited by examiner

*Primary Examiner* — Matthew J. Peerce
(74) *Attorney, Agent, or Firm* — Clements Bernard Walker; Christopher L. Bernard

(57) ABSTRACT

A deformable carrier assembly adapted to hold an elongate light guide in a vehicle, the deformable carrier assembly including: a first component adapted to receive and retain a first portion of the elongate light guide and including a break-away pin at an end thereof; and a second component adapted to receive and retain a second portion of the elongate light guide and including a loop structure at an end thereof; wherein the loop structure is adapted to engage the break-away pin and couple the first component to the second component; and wherein the break-away pin is adapted to be sheared off of the end of the first component and decouple the first component from the second component when a lateral force is applied to one or more of the first component and the second component.

21 Claims, 5 Drawing Sheets

DEFORMABLE CARRIER FOR AN ELONGATE LIGHT GUIDE IN A VEHICLE

TECHNICAL FIELD

The present disclosure relates generally to the automotive field. More particularly, the present disclosure relates to a deformable carrier for an elongate light guide in a vehicle.

BACKGROUND

In a vehicle interior, it is often desirable to use an elongate light guide to provide accent lighting across a dashboard of the vehicle, along a door of the vehicle, around the roofline or floor of the vehicle, etc. Such elongate light guide is used to transmit light from one or more light sources, such as one or more light-emitting diodes (LEDs) or the like, across, along, or around the structure of interest, following the contours thereof. Typically, the elongate light guide is manufactured from a flexible plastic material or the like and is coupled to an elongate carrier that is manufactured from a rigid plastic material or the like. The elongate carrier consists of a concave trough or cradle structure that conforms to the structure of interest and in which the elongate light guide is partially disposed and retained.

In cases in which the elongate carrier and elongate light guide traverse a dashboard, within the air vents, for example, the elongate carrier and elongate light guide may interfere with a collapsing steering wheel and/or a deploying airbag in the event of a vehicle impact. In such a case, the elongate carrier, which is manufactured from a rigid plastic material or the like, may undesirably damage the deploying airbag.

Thus, it is desirable to use a deformable carrier for an elongate light guide in cases in which the elongate carrier and elongate light guide traverse a dashboard, for example, and may interfere with a collapsing steering wheel and/or a deploying airbag in the event of a vehicle impact. It may be desirable to use a deformable carrier in other cases as well, especially in an autonomous drive (AD) vehicle, which may more commonly use elongate light guides and have a moveable steering wheel and variable seating and airbag configurations.

SUMMARY

The present disclosure provides a deformable carrier for an elongate light guide in cases in which the elongate carrier and elongate light guide traverse a dashboard, for example, and may interfere with a collapsing steering wheel and/or a deploying airbag in the event of a vehicle impact. The deformable carrier, which may be manufactured from a rigid plastic material or the like, prevents damage to the deploying airbag, for example.

The deformable carrier includes a first carrier component and a second carrier component. The first component is adapted to hold a first portion of the elongate light guide and includes a break-away pin disposed at an end thereof. The second component is adapted to hold a second portion of the elongate light guide and includes a loop structure disposed at an end thereof. The loop structure is adapted to be disposed about and retain the break-away pin to couple the first component and the first portion of the elongate light guide to the second component and the second portion of the elongate light guide. This forms a unitary carrier and elongate light guide. When a force is applied lateral to the deformable carrier, in a direction that is disposed at an angle to the longitudinal axis thereof, the loop structure of the second component is adapted to disengage from the break-away pin of the first component. Alternatively, or in addition, the break-away pin of the first component is adapted to shear off of the first component, thereby disengaging the loop structure of the second component from the first component.

The first component and the second component of the deformable carrier each consist of a concave trough or cradle structure that collectively conform to the structure of interest and in which the first portion and the second portion of the elongate light guide are partially disposed and retained. The resulting deformable carrier and elongate light guide may include multiple break-away joints or disengagement points such that a contacting steering wheel, airbag, and/or the like is accommodated and not damaged in the event of a vehicle impact.

In one exemplary embodiment, the present disclosure provides a deformable carrier assembly adapted to hold an elongate light guide in a vehicle, the deformable carrier assembly including: a first component adapted to receive and retain a first portion of the elongate light guide and including a break-away pin at an end thereof; and a second component adapted to receive and retain a second portion of the elongate light guide and including a loop structure at an end thereof; wherein the loop structure is adapted to engage the break-away pin and couple the first component to the second component; and wherein the break-away pin is adapted to be sheared off of the end of the first component and decouple the first component from the second component when a lateral force is applied to one or more of the first component and the second component. The first component and the second component are each manufactured from a rigid plastic material. The first portion and the second portion of the elongate light guide are each manufactured from a flexible plastic material. The first component and the second component each include a concave section that is adapted to receive and retain the first portion and the second portion of the elongate light guide, respectively. The lateral force applied to the one or more of the first component and the second component serves to pivot the end of the first component with respect to the end of the second component and shear the break-away pin off of the end of the first component and decouple the first component from the second component. Optionally, the lateral force is applied by one or more of a collapsing steering wheel of the vehicle and a deploying airbag of the vehicle.

In another exemplary embodiment, the present disclosure provides a deformable light guide assembly adapted to be used in a vehicle, the deformable light guide assembly including: an elongate light guide adapted to be coupled to one or more light sources; a first component adapted to receive and retain a first portion of the elongate light guide and including a break-away pin at an end thereof; and a second component adapted to receive and retain a second portion of the elongate light guide and including a loop structure at an end thereof; wherein the loop structure is adapted to engage the break-away pin and couple the first component to the second component; and wherein the break-away pin is adapted to be sheared off of the end of the first component and decouple the first component from the second component when a lateral force is applied to one or more of the first component and the second component. The first component and the second component are each manufactured from a rigid plastic material. The first portion and the second portion of the elongate light guide are each manufactured from a flexible plastic material. The first component and the second component each include a concave section that is adapted to receive and retain the first portion and the second portion of the elongate light guide, respectively. The lateral force applied to the one or more of the first component and the second component serves to pivot the end of the first component with respect to the end of the second component and shear the break-away pin off of the end of the first component and decouple the first component from the second component. Optionally, the lateral force is applied by one or more of a collapsing steering wheel of the vehicle and a deploying airbag of the vehicle.

In a further exemplary embodiment, the present disclosure provides a deformable light assembly adapted to be used in a vehicle, the deformable light assembly including: one or more light sources; an elongate light guide adapted to be coupled to the one or more light sources; a first component adapted to receive and retain a first portion of the elongate light guide and including a break-away pin at an end thereof; and a second component adapted to receive and retain a second portion of the elongate light guide and including a loop structure at an end thereof; wherein the loop structure is adapted to engage the break-away pin and couple the first component to the second component; and wherein the break-away pin is adapted to be sheared off of the end of the first component and decouple the first component from the second component when a lateral force is applied to one or more of the first component and the second component. The first component and the second component are each manufactured from a rigid plastic material. The first portion and the second portion of the elongate light guide are each manufactured from a flexible plastic material. The first component and the second component each include a concave section that is adapted to receive and retain the first portion and the second portion of the elongate light guide, respectively. The lateral force applied to the one or more of the first component and the second component serves to pivot the end of the first component with respect to the end of the second component and shear the break-away pin off of the end of the first component and decouple the first component from the second component. Optionally, the lateral force is applied by one or more of a collapsing steering wheel of the vehicle and a deploying airbag of the vehicle.

BRIEF DESCRIPTION OF THE DRAWINGS

The present disclosure is illustrated and described herein with reference to the various drawings, in which like reference numbers are used to denote like assembly components/method steps, as appropriate, and in which.

DESCRIPTION OF EMBODIMENTS

Again, the present disclosure provides a deformable carrier for an elongate light guide in cases in which the elongate carrier and elongate light guide traverse a dashboard, for example, and may interfere with a collapsing steering wheel and/or a deploying airbag in the event of a vehicle impact. The deformable carrier, which may be manufactured from a rigid plastic material or the like, prevents damage to the deploying airbag, for example.

The deformable carrier includes a first carrier component and a second carrier component. The first component is adapted to hold a first portion of the elongate light guide and includes a break-away pin disposed at an end thereof. The second component is adapted to hold a second portion of the elongate light guide and includes a loop structure disposed at an end thereof. The loop structure is adapted to be disposed about and retain the break-away pin to couple the first component and the first portion of the elongate light guide to the second component and the second portion of the elongate light guide. This forms a unitary carrier and elongate light guide. When a force is applied lateral to the deformable carrier, in a direction that is disposed at an angle to the longitudinal axis thereof, the loop structure of the second component is adapted to disengage from the break-away pin of the first component. Alternatively, or in addition, the break-away pin of the first component is adapted to shear off of the first component, thereby disengaging the loop structure of the second component from the first component.

The first component and the second component of the deformable carrier each consist of a concave trough or cradle structure that collectively conform to the structure of interest and in which the first portion and the second portion of the elongate light guide are partially disposed and retained. The resulting deformable carrier and elongate light guide may include multiple break-away joints or disengagement points such that a contacting steering wheel, airbag, and/or the like is accommodated and not damaged in the event of a vehicle impact.

Figure 1:
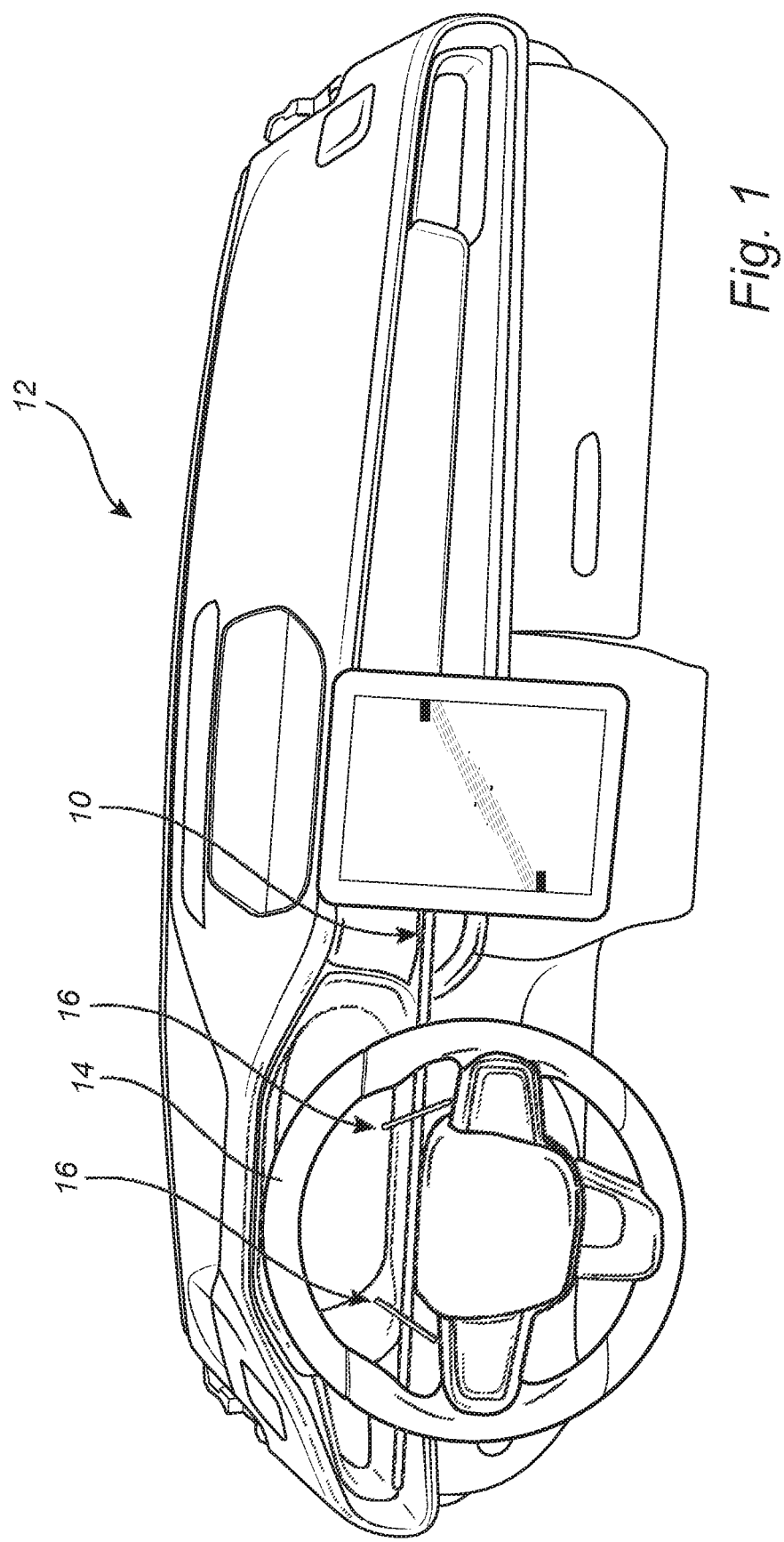
FIG. 1 is a perspective view of a dashboard of a vehicle utilizing the deformable carrier and elongate light guide of the present disclosure, highlighting the disengagement points of the deformable carrier and elongate light guide such that interference with and/or damage to a collapsing steering wheel and/or deploying airbag is avoided in the event of a vehicle impact.

Referring now specifically to FIG. 1, by way of example only, the elongate light guide assembly 10 of the present disclosure may provide lighting across the dashboard 12 of an AD vehicle. The elongate light guide assembly 10 may pass behind the steering wheel 14, which may be selectively stowable under or in the dashboard 12, for example. Here, the elongate light guide assembly 10 may interfere with a deploying airbag, which may emerge from the dashboard 12 in the location of the stowable steering wheel 14, for example. Disadvantageously, the elongate light guide assembly 10 could damage the deploying airbag. This is remedied by the used of the deformable light guide assembly 10 of the present disclosure. Upon impact by a lateral deploying airbag force or the like, the deformable light guide assembly 10 may separate in one or more positions 16, thereby effectively removing the deformable light guide assembly 10 from the path of the deploying airbag. In this respect, the deformable light guide assembly 10 may have a breakable joint or one or more break-away sections that may be separated by any number of applied lateral forces from any number of sources.

Figure 2:
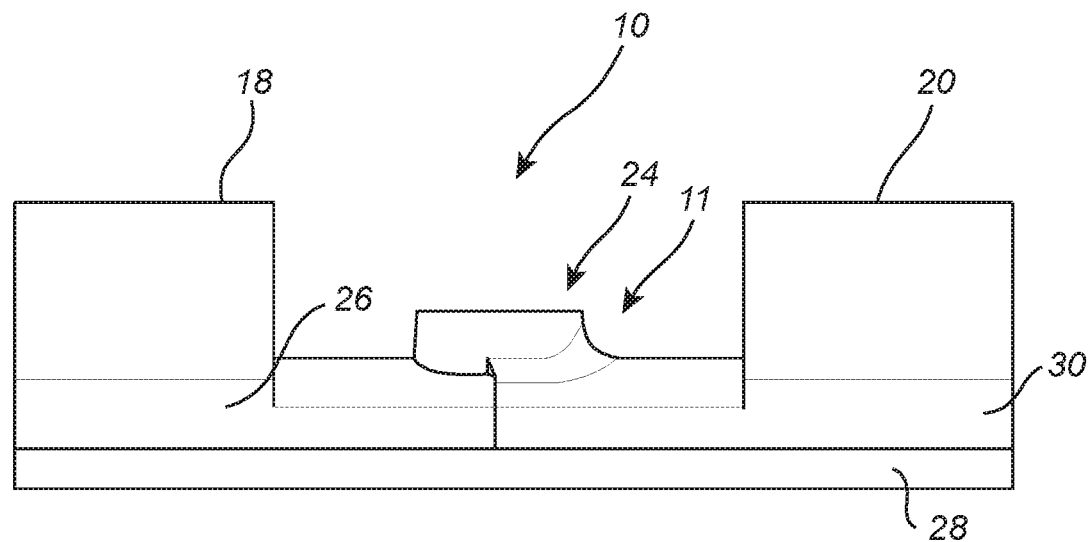
FIG. 2 is a planar view of one exemplary embodiment of the deformable carrier and elongate light guide of the present disclosure in an assembled configuration.
Figure 3:
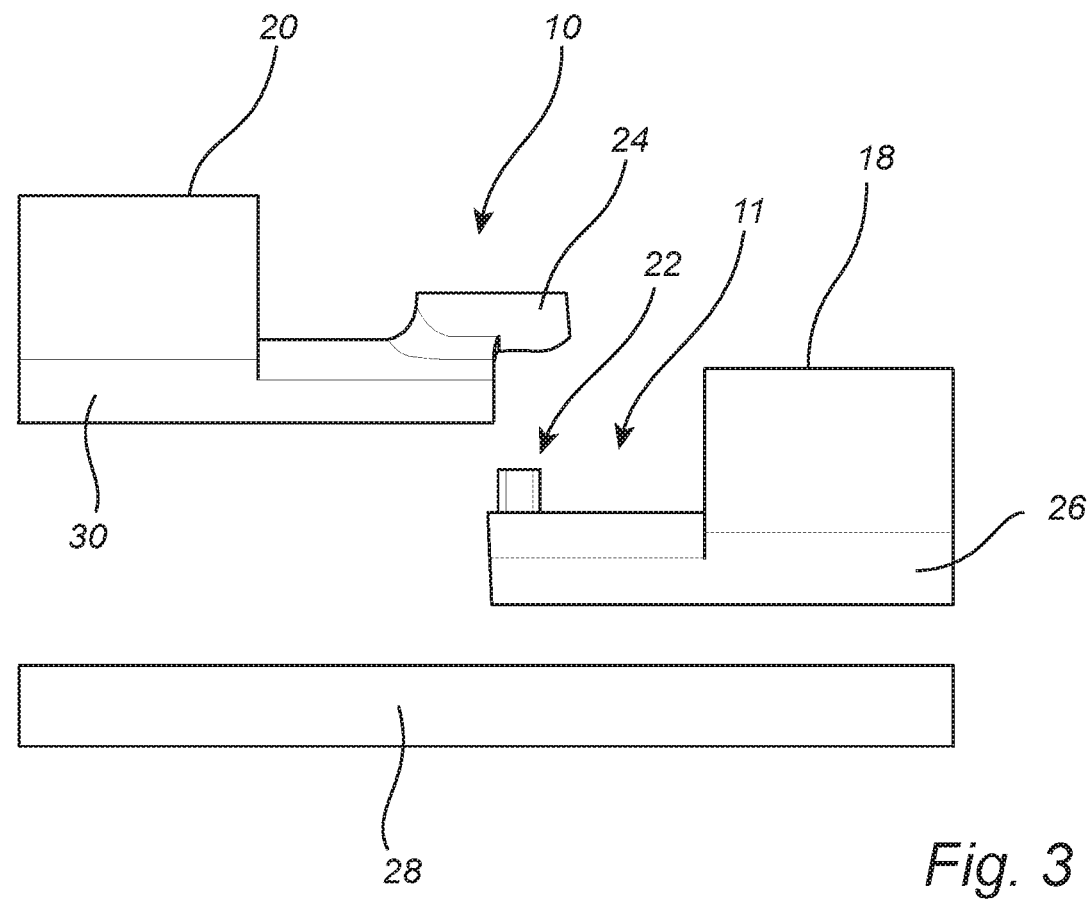
FIG. 3 is a planar view of one exemplary embodiment of the deformable carrier and elongate light guide of the present disclosure in a disassembled configuration.

Referring now specifically to FIGS. 2 and 3, the deformable light guide assembly 10 includes a deformable carrier assembly 11 coupled to an elongate light guide 28. Preferably, the deformable carrier assembly 11 is manufactured from a rigid plastic material or the like and may be formed in any desired structural shape. The elongate light guide 28 is manufactured from a flexible plastic material or the like and conforms to the structural shape of the deformable carrier assembly 11.

The deformable carrier 11 includes a first carrier component 18 detachably coupled to a second carrier component 20. The first component 18 is adapted to hold a first portion of the elongate light guide 28 and includes a break-away pin 22 (FIG. 3) disposed at an end thereof. As illustrated, the break-away pin 22 is coupled to a thinned end of the first component 18 opposite the elongate light guide 28 and oriented longitudinally-perpendicular to the elongate light guide 28. The break-away pin 22 may have a substantially-circular cross-sectional shape, a substantially-oval cross-sectional shape, a substantially-square cross-sectional shape, a substantially-rectangular cross-sectional shape, etc. The second component 20 is adapted to hold a second portion of the elongate light guide 28 and includes a loop structure 24 disposed at an end thereof. As illustrated, the loop structure 24 is coupled to a thinned end of the second component 20 opposite the elongate light guide 28 and oriented longitudinally-perpendicular to the elongate light guide 28. The loop structure 24 may have a substantially-circular cross-sectional shape, a substantially-oval cross-sectional shape, a substantially-square cross-sectional shape, a substantially-rectangular cross-sectional shape, etc., preferably corresponding to the cross-sectional shape of the break-away pin 22. The loop structure 24 is adapted to be disposed about and retain the break-away pin 22 to couple the first component 18 and the first portion of the elongate light guide 28 to the second component 20 and the second portion of the elongate light guide 28 in a linear fashion. This forms a unitary carrier 11 and elongate light guide 28. When a force is applied lateral to the deformable carrier 11, in a direction that is disposed at an angle to the longitudinal axis thereof, the loop structure 24 of the second component 20 is adapted to disengage from the break-away pin 22 of the first component 18. Alternatively, or in addition, the break-away pin 22 of the first component 18 is adapted to shear off of the first component 18, thereby disengaging the loop structure 24 of the second component 20 from the first component 18.

The first component 18 and the second component 20 of the deformable carrier 11 each consist of a concave trough or cradle structure 26 and 30 that collectively conform to the structure of interest and in which the first portion and the second portion of the elongate light guide 28 are partially disposed and retained, with a portion of the elongate light guide 28 being exposed by the concave trough or cradle structure 26 and 30 and visible, directly or indirectly, from the interior of the vehicle. The resulting deformable carrier 11 and elongate light guide 28 may include multiple break-away joints or disengagement points 16 (FIG. 1) such that a contacting steering wheel 14 (FIG. 1), airbag, and/or the like is accommodated and not damaged in the event of a vehicle impact.

Figure 4:
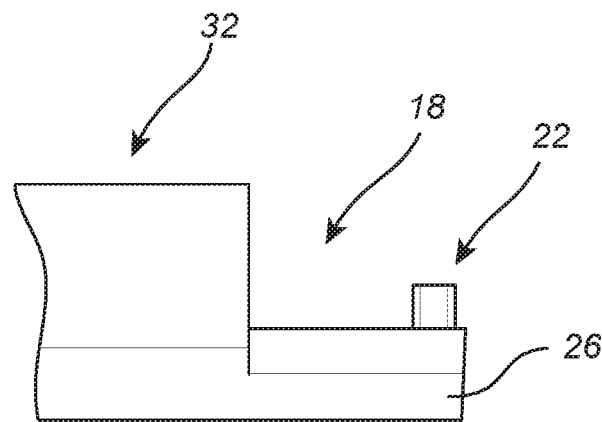
FIG. 4 is a planar view of the first component of the deformable carrier of the present disclosure, the first component including a break-away pin that selectively engages the associated second component.

Referring now specifically to FIG. 4, the first component 18 is adapted to hold a first portion of the elongate light guide 28 (FIGS. 2 and 3) and includes a break-away pin 22 disposed at an end thereof. As illustrated, the break-away pin 22 is coupled to a thinned end of the first component 18 opposite the elongate light guide 28 and oriented longitudinally-perpendicular to the elongate light guide 28. The break-away pin 22 may have a substantially-circular cross-sectional shape, a substantially-oval cross-sectional shape, a substantially-square cross-sectional shape, a substantially-rectangular cross-sectional shape, etc. The remainder of the first component 18 consists of the concave track 26 in which the first portion of the elongate light guide 28 is secured and a support member 32, such as a frame structure or the like, that provides the first component 18 with its structural integrity and rigidity. The concave track 26 and support member 32 may be collectively formed in any desired shape such that the coupled elongate light guide 28 follows any desired path.

Figure 5:
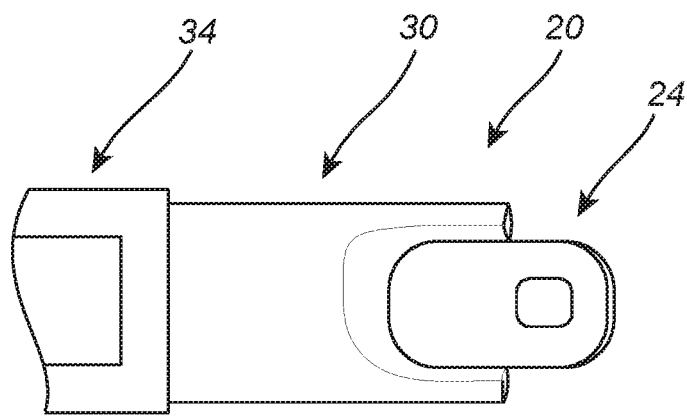
FIG. 5 is a planar view of the second component of the deformable carrier of the present disclosure, the second component including a loop structure that selectively engages the associated first component.

Referring now specifically to FIG. 5, the second component 20 is adapted to hold a second portion of the elongate light guide 28 (FIGS. 2 and 3) and includes a loop structure 24 disposed at an end thereof. As illustrated, the loop structure 24 is coupled to a thinned end of the second component 20 opposite the elongate light guide 28 and oriented longitudinally-perpendicular to the elongate light guide 28. The loop structure 24 may have a substantially-circular cross-sectional shape, a substantially-oval cross-sectional shape, a substantially-square cross-sectional shape, a substantially-rectangular cross-sectional shape, etc., preferably corresponding to the cross-sectional shape of the break-away pin 22 (FIGS. 3 and 4). The remainder of the second component 20 consists of the concave track 30 in which the second portion of the elongate light guide 28 is secured and a support member 34, such as a frame structure or the like, that provides the second component 20 with its structural integrity and rigidity. The concave track 30 and support member 34 may be collectively formed in any desired shape such that the coupled elongate light guide 28 follows any desired path. The loop structure 24 is adapted to be disposed about and retain the break-away pin 22 to couple the first component 18 (FIGS. 2-4) and the first portion of the elongate light guide 28 to the second component 20 and the second portion of the elongate light guide 28 in a linear fashion. This forms a unitary carrier 11 (FIGS. 2 and 3) and elongate light guide 28.

Figure 6:
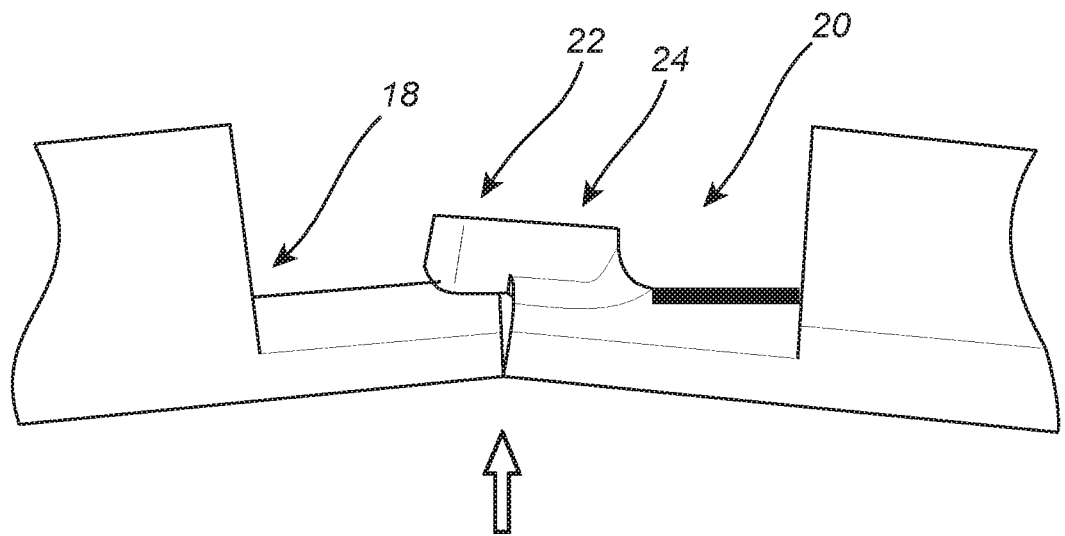
FIG. 6 is a planar view of one exemplary embodiment of the deformable carrier of the present disclosure being impacted by a lateral force, thereby beginning to disengage the second component from the first component.
Figure 7:
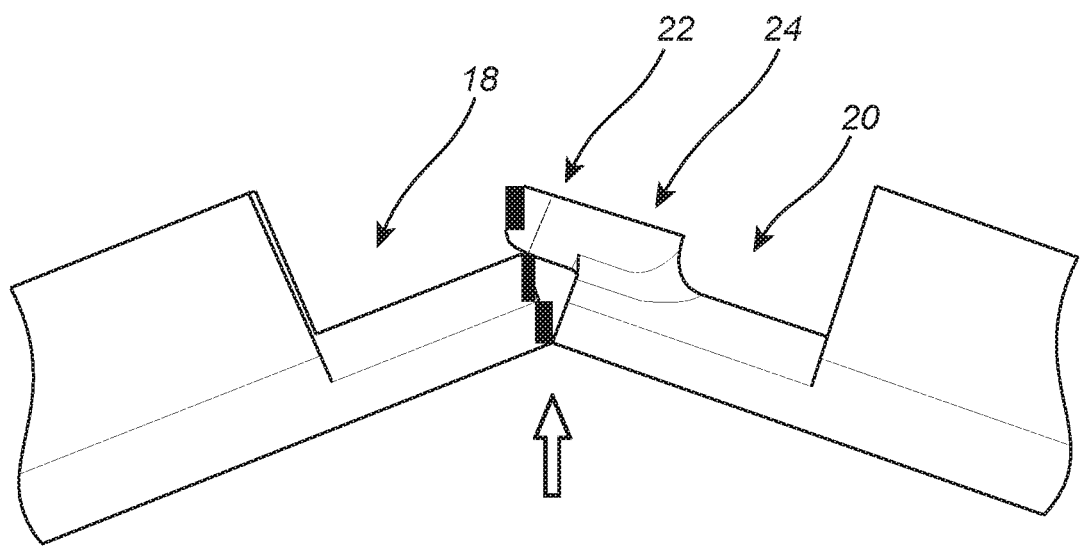
FIG. 7 is another planar view of one exemplary embodiment of the deformable carrier of the present disclosure being impacted by a lateral force, thereby disengaging the second component from the first component by partial shearing-off of the break-away pin of the first component.
Figure 8:
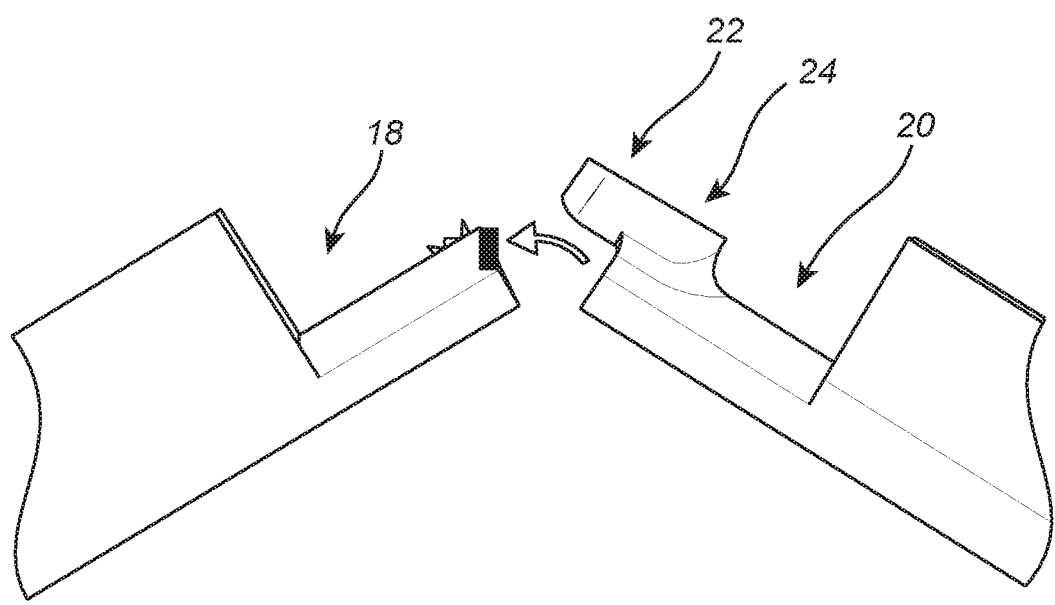
FIG. 8 is a further planar view of one exemplary embodiment of the deformable carrier of the present disclosure being impacted by a lateral force, thereby disengaging the second component from the first component by full shearing-off of the break-away pin of the first component.

FIGS. 6-8 illustrate the operation of the disengagement or break-away functionality of the light guide carrier assembly 11 of the present disclosure when a lateral force partially or wholly perpendicular to the longitudinal axis of the light guide carrier assembly 11 is applied to one of the joints. The lateral force serves to rotate or pivot the first component 18 and the second component 20 with respect to one another such that the loop structure 24 of the second component 20 applies a torque to the break-away pin 22 of the first component 18. This torque ultimately serves to shear the break-away pin 22 off of the first component 18, such that the first component 18 and the second component 20 become disengaged from one another. At this point, the flexible light guide 28 (FIGS. 2 and 3) may remain intact.

Thus, the present disclosure provides a deformable carrier for an elongate light guide in cases in which the elongate carrier and elongate light guide traverse a dashboard, for example, and may interfere with a collapsing steering wheel and/or a deploying airbag in the event of a vehicle impact. The deformable carrier, which may be manufactured from a rigid plastic material or the like, prevents damage to the deploying airbag, for example.

The deformable carrier includes a first carrier component and a second carrier component. The first component is adapted to hold a first portion of the elongate light guide and includes a break-away pin disposed at an end thereof. The second component is adapted to hold a second portion of the elongate light guide and includes a loop structure disposed at an end thereof. The loop structure is adapted to be disposed about and retain the break-away pin to couple the first component and the first portion of the elongate light guide to the second component and the second portion of the elongate light guide. This forms a unitary carrier and elongate light guide. When a force is applied lateral to the deformable carrier, in a direction that is disposed at an angle to the longitudinal axis thereof, the loop structure of the second component is adapted to disengage from the break-away pin of the first component. Alternatively, or in addition, the break-away pin of the first component is adapted to shear off of the first component, thereby disengaging the loop structure of the second component from the first component.

The first component and the second component of the deformable carrier each consist of a concave trough or cradle structure that collectively conform to the structure of interest and in which the first portion and the second portion of the elongate light guide are partially disposed and retained. The resulting deformable carrier and elongate light guide may include multiple break-away joints or disengagement points such that a contacting steering wheel, airbag, and/or the like is accommodated and not damaged in the event of a vehicle impact.

Although the present disclosure is illustrated and described with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A deformable carrier assembly adapted to hold an elongate light guide in a vehicle, the deformable carrier assembly comprising:
   a first component adapted to receive and retain a first portion of the elongate light guide; and
   a second component adapted to receive and retain a second portion of the elongate light guide;
   wherein the first portion of the elongate light guide and the second portion of the elongate light guide are integrally formed;
   wherein the first component is adapted to be coupled to the second component by a pin disposed at an end of the first component and a corresponding loop structure disposed at an end of the second component; and
   wherein the first component is adapted to be decoupled from the second component when a lateral force is applied to one or more of the first portion of the elongate light guide and the first component and the second portion of the elongate light guide and the second component with each of the first component and the second component remaining coupled to the elongate light guide.

2. The deformable carrier assembly of claim 1, wherein the first component and the second component are each manufactured from a rigid plastic material.

3. The deformable carrier assembly of claim 1, wherein the first portion and the second portion of the elongate light guide are each manufactured from a flexible plastic material.

4. The deformable carrier assembly of claim 1, wherein the first component and the second component each comprise a concave section that is adapted to receive and retain the first portion and the second portion of the elongate light guide, respectively.

5. The deformable carrier assembly of claim 1, wherein:
   the pin comprises a break-away pin that is adapted to be sheared off of the end of the first component by the loop structure disposed at the end of the second component to decouple the first component from the second component when the lateral force is applied to the one or more of the first portion of the elongate light guide and the first component and the second portion of the elongate light guide and the second component.

6. The deformable carrier assembly of claim 5, wherein the lateral force applied to the one or more of the first portion of the elongate light guide and the first component and the second portion of the elongate light guide and the second component serves to pivot the end of the first component with respect to the end of the second component and cause the loop structure disposed at the end of the second component to shear the break-away pin off of the end of the first component to decouple the first component from the second component.

7. The deformable carrier assembly of claim 1, where the lateral force is applied by one or more of a collapsing steering wheel of the vehicle and a deploying airbag of the vehicle.

8. A deformable light guide assembly adapted to be used in a vehicle, the deformable light guide assembly comprising:
   an elongate light guide adapted to be coupled to one or more light sources;
   a first component adapted to receive and retain a first portion of the elongate light guide; and
   a second component adapted to receive and retain a second portion of the elongate light guide;
   wherein the first portion of the elongate light guide and the second portion of the elongate light guide are integrally formed;
   wherein the first component is adapted to be coupled to the second component by a pin disposed at an end of the first component and a corresponding loop structure disposed at an end of the second component; and
   wherein the first component is adapted to be decoupled from the second component when a lateral force is applied to one or more of the first portion of the elongate light guide and the first component and the second portion of the elongate light guide and the second component with each of the first component and the second component remaining coupled to the elongate light guide.

9. The deformable light guide assembly of claim 8, wherein the first component and the second component are each manufactured from a rigid plastic material.

10. The deformable light guide assembly of claim 8, wherein the first portion and the second portion of the elongate light guide are each manufactured from a flexible plastic material.

11. The deformable light guide assembly of claim 8, wherein the first component and the second component each comprise a concave section that is adapted to receive and retain the first portion and the second portion of the elongate light guide, respectively.

12. The deformable light guide assembly of claim 8, wherein:
the pin comprises a break-away pin that is adapted to be sheared off of the end of the first component by the loop structure disposed at the end of the second component to decouple the first component from the second component when the lateral force is applied to the one or more of the first portion of the elongate light guide and the first component and the second portion of the elongate light guide and the second component.

13. The deformable light guide assembly of claim 12, wherein the lateral force applied to the one or more of the first portion of the elongate light guide and the first component and the second portion of the elongate light guide and the second component serves to pivot the end of the first component with respect to the end of the second component and cause the loop structure disposed at the end of the second component to shear the break-away pin off of the end of the first component to decouple the first component from the second component.

14. The deformable light guide assembly of claim 8, where the lateral force is applied by one or more of a collapsing steering wheel of the vehicle and a deploying airbag of the vehicle.

15. A deformable light assembly adapted to be used in a vehicle, the deformable light assembly comprising:
one or more light sources;
an elongate light guide adapted to be coupled to the one or more light sources;
a first component adapted to receive and retain a first portion of the elongate light guide; and
a second component adapted to receive and retain a second portion of the elongate light guide;
wherein the first portion of the elongate light guide and the second portion of the elongate light guide are integrally formed;
wherein the first component is adapted to be coupled to the second component by a pin disposed at an end of the first component and a corresponding loop structure disposed at an end of the second component; and
wherein the first component is adapted to be decoupled from the second component when a lateral force is applied to one or more of the first portion of the elongate light guide and the first component and the second portion of the elongate light guide and the second component with each of the first component and the second component remaining coupled to the elongate light guide.

16. The deformable light assembly of claim 15, wherein the first component and the second component are each manufactured from a rigid plastic material.

17. The deformable light assembly of claim 15, wherein the first portion and the second portion of the elongate light guide are each manufactured from a flexible plastic material.

18. The deformable light assembly of claim 15, wherein the first component and the second component each comprise a concave section that is adapted to receive and retain the first portion and the second portion of the elongate light guide, respectively.

19. The deformable light assembly of claim 15, wherein:
the pin comprises a break-away pin that is adapted to be sheared off of the end of the first component by the loop structure disposed at the end of the second component to decouple the first component from the second component when the lateral force is applied to the one or more of the first portion of the elongate light guide and the first component and the second portion of the elongate light guide and the second component.

20. The deformable light assembly of claim 19, wherein the lateral force applied to the one or more of the first portion of the elongate light guide and the first component and the second portion of the elongate light guide and the second component serves to pivot the end of the first component with respect to the end of the second component and cause the loop structure disposed at the end of the second component to shear the break-away pin off of the end of the first component to decouple the first component from the second component.

21. The deformable light assembly of claim 15, where the lateral force is applied by one or more of a collapsing steering wheel of the vehicle and a deploying airbag of the vehicle.

* * * * *